United States Patent [19]
Yoshikawa et al.

[11] Patent Number: 5,174,733
[45] Date of Patent: Dec. 29, 1992

[54] SUPERCHARGER

[75] Inventors: Takaya Yoshikawa; Noboru Ishida, both of Aichi, Japan

[73] Assignee: NGK Spark Plug Co., Ltd., Nagoya, Japan

[21] Appl. No.: 745,857

[22] Filed: Aug. 16, 1991

[30] Foreign Application Priority Data

Aug. 22, 1990 [JP] Japan ................. 2-221636

[51] Int. Cl.$^5$ .................................... F04B 17/00
[52] U.S. Cl. ..................... 417/407; 416/241 B
[58] Field of Search .......... 417/405, 406, 407; 416/244 A, 241 B; 403/30, 28, 273; 29/889.21, 889.2

[56] References Cited

U.S. PATENT DOCUMENTS

| | | | |
|---|---|---|---|
| 4,281,941 | 8/1981 | Rottenkolber | 29/889.2 |
| 4,557,704 | 12/1985 | Ito et al. | 416/241 B |
| 4,614,453 | 9/1986 | Tsuno et al. | 403/273 |
| 4,639,194 | 1/1987 | Bell et al. | 416/244 A |
| 4,659,245 | 4/1987 | Hirao et al. | 403/30 |
| 4,690,617 | 9/1987 | Oda et al. | 416/241 B |
| 4,747,722 | 5/1988 | Kawaguchi et al. | 403/30 |
| 4,798,493 | 1/1989 | Oda et al. | 417/407 |
| 4,856,970 | 8/1989 | Oda et al. | 417/407 |
| 4,942,999 | 7/1990 | Oda et al. | 416/241 B |
| 5,066,547 | 11/1991 | Ishida et al. | 416/241 B |
| 5,089,312 | 2/1992 | Kawase et al. | 403/30 |

FOREIGN PATENT DOCUMENTS

| | | |
|---|---|---|
| 0365253 | 4/1990 | European Pat. Off. . |
| 2574783 | 8/1986 | France . |
| 59-103902 | 6/1984 | Japan . |
| 61-268801 | 11/1986 | Japan . |
| 63-93401 | 6/1988 | Japan . |
| 502133 | 4/1976 | U.S.S.R. .................. 403/273 |
| 2175958 | 12/1986 | United Kingdom . |

Primary Examiner—Richard A. Bertsch
Assistant Examiner—Timothy S. Thorpe
Attorney, Agent, or Firm—Foiley & Lardner

[57] ABSTRACT

A turbocharger for an automotive vehicle includes a rotatable shaft having a cup-shaped section to which an axial projection of a turbine wheel is fitted under a shrinkage fit. The rotatable shaft is rotatably supported by ball bearings. A nut is screwed on the rotatable shaft in a manner to clamp the ball bearings together with a compressor wheel between the nut and the cup-shaped section. The inner race of the ball bearing on the turbine wheel side is in axially tight contact with an abutting surface formed in the rotatable shaft. In this arrangement, a setting is made to satisfy the following formula. $l/P \geq 0.002$ where l is a distance (mm) in the rotatable shaft, between a bottom inner surface of the cup-shaped section and the abutting surface; and P is an axial tensile force developed by screwing up the nut in the direction of the cup-shaped section.

12 Claims, 3 Drawing Sheets

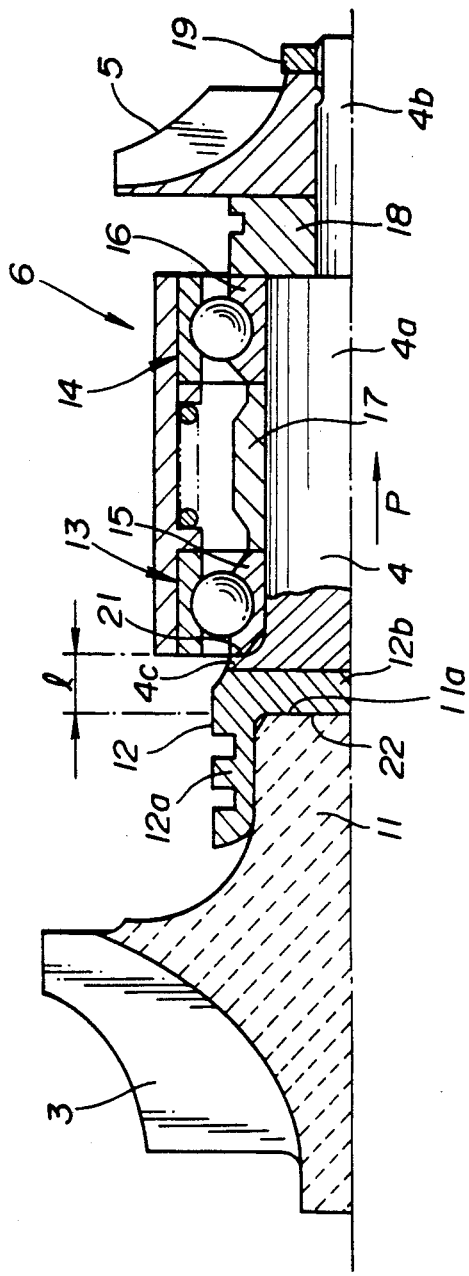
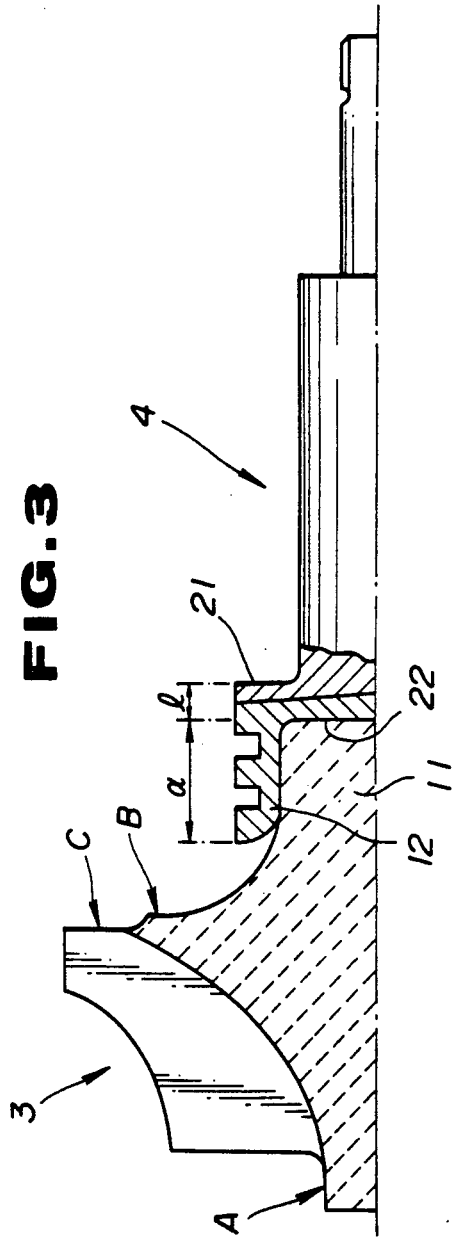

SUPERCHARGER

BACKGROUND OF THE INVENTION

1. Field of the Invention

This invention relates to improvements in a rotating structure of a supercharger of the type wherein a ceramic turbine wheel is joined with a metallic rotatable shaft in a manner so that a projection of the turbine wheel is fitted in a cup-shaped section of the rotatable shaft and wherein a compressor wheel is installed to be biased against the cup-shaped section through an inner race of a rolling bearing for rotatably supporting the rotatable shaft under a screw torque of a nut, and more particularly to the rotating structure which is suitable for use in a turbocharger or a gas turbine.

2. Description of the Prior Art

A turbocharger is well known as an example of a supercharge in which intake air is supplied under pressure to a combustion chamber under the effect of energy developed by combustion. It is also well known that a turbine wheel of the turbocharger is made of a ceramic to improve a response in rotational movement. The ceramic turbine wheel is usually axially joined with a metallic rotatable shaft, which is accomplished, for example, by a shrinkage fit. In this shrinkage fit, an axial projection of the turbine wheel is fitted in a cup-shaped section formed at an end of the rotatable shaft under heating, in which the turbine wheel and the rotatable shaft are rigidly joined by virtue of a thermal shrinkage of the cup-shaped section. Additionally, it is well known that a bearing structure for rotatably supporting the rotatable shaft has been changed from a floating metal bearing to a rolling bearing in order to improve the response at a low vehicle speed.

A conventional turbocharger including the above-discussed known structure in connection with the rotatable shaft is shown in FIG. 4. In FIG. 4, the rotatable shaft 106 is rotatably supported by two rolling bearings 101, 102 which are located respectively at the sides of the turbine wheel 103 and the compressor wheel 104. A spacer 105 is disposed between the rolling bearings 101, 102. The inner races 101a, 102a of the rolling bearings 101, 102, the spacer 105 and the compressor wheel 104 are put between the cup-shaped section 108 and a nut 107 screwed on a compressor wheel side end portion of the rotatable shaft, so that they are fixedly mounted on the rotatable shaft like a single member.

However, the following drawbacks have been encountered in the above-discussed conventional turbocharger: The screw torque of the nut 107 develops a biasing force for urging the bearing inner race 101a against the cup-shaped section in a direction indicated by an arrow D, and simultaneously a tensile force for drawing the rotatable shaft 106 in a direction indicated by an arrow E, as shown in FIG. 4. In other words, a stress is developed at a position F between a location (to which the bearing inner race 101a is biased) of the cup-shaped section 108 and a major part of the rotatable shaft 106 due to the screw torque of the nut 107. If the screw torque of the nut 107 is increased, the bottom portion of the cup-shaped section 108 is drawn by the rotatable shaft 106, and therefore the cup-shaped section 108 deforms so that the rotatable shaft 106 moves toward the nut 107.

Thus, even if the screw torque of the nut 107 is increased, a sufficient force for clamping the two bearing inner races 101a, 102a, the spacer 105 and the compressor wheel 104 cannot be obtained between the cup-shaped section and the nut 107. Additionally, according to a particular distance between the bottom inner surface of the cup-shaped section 108 and the location (to which the bearing inner race 101a is biased) of the cup-shaped section 108, there is the possibility of weakening a holding force of the cup-shaped section 108 to the turbine wheel 103. The thus weakened holding force unavoidably causes the turbine wheel 103 to produce a change in rotational balance.

SUMMARY OF THE INVENTION

It is an object of the present invention to provide an improved supercharger which can effectively overcome drawbacks encountered in a conventional supercharger of the above-discussed type.

Another object of the present invention is to provide an improved supercharger in which a turbine wheel is effectively prevented from producing a change in rotational balance.

A further object of the present invention is to provide an improved supercharger in which the inner race of a rolling bearing and a compressor wheel are sufficiently tightly clamped between a cup-shaped section of a rotatable shaft and a nut screwed on the rotatable shaft, while effectively preventing the cup-shaped section (to which an axial projection of a turbine wheel is joined) from deformation even under a high screw torque generated by tightening the nut.

A supercharger of the present invention is comprised of a turbine wheel made of a ceramic and having an axially extending projection. A rotatable shaft made of metal is provided to have a generally cup-shaped section at its first end portion. The turbine wheel projection is fixedly fitted in the cup-shaped section. A rolling bearing is provided to rotatably support the rotatable shaft. A compressor wheel is fixedly mounted on the rotatable shaft at a second portion which is opposite to the first end portion. A nut is mounted on the rotatable shaft second end portion and engaged with an external thread formed on the rotatable shaft second end portion. The nut is positioned axially outside of the compressor wheel in a manner so that the inner race of the rolling bearing and the compressor wheel are tightly clamped between the rotatable shaft cup-shaped section and the nut. In the above arrangement, a setting is made to satisfy a relationship expressed by the following formula:

$$l/P \geqq 0.002$$

where l is a distance (mm) in the rotatable shaft, between a bottom inner surface (22) of the cup-shaped section and an abutting surface (21) against which the rolling bearing inner race axially abuts; and P is an axial tensile force (kg) developed by screwing the nut in the direction of the cup-shaped section.

By virtue of setting the distance l (mm) at a value in accordance with the tensile force P (kg) so as to satisfy the relationship of $l/P \geqq 0.002$, the cup-shaped section is prevented from deformation by the tensile force P in the axial direction. As a result, the rolling bearing inner race and the compressor wheel can be rigidly clamped between the cup-shaped section and the nut by screwing up the nut, while effectively suppressing a change in rotational balance of the turbine wheel even upon use throughout a long period of time. Additionally, the enlarged distance l (mm) increases a force by which the turbine wheel projection is supported by the cup-shaped section, which further improves the rotational balance suppressing effect.

BRIEF DESCRIPTION OF THE DRAWINGS

FIG. 2 is a fragmentary sectional view of an essential part of the supercharger of FIG. 1;

FIG. 3 is a fragmentary sectional explanatory view of an essential part of the supercharger, illustrating a manner of experiments.

DETAILED DESCRIPTION OF THE INVENTION

Figure 1:
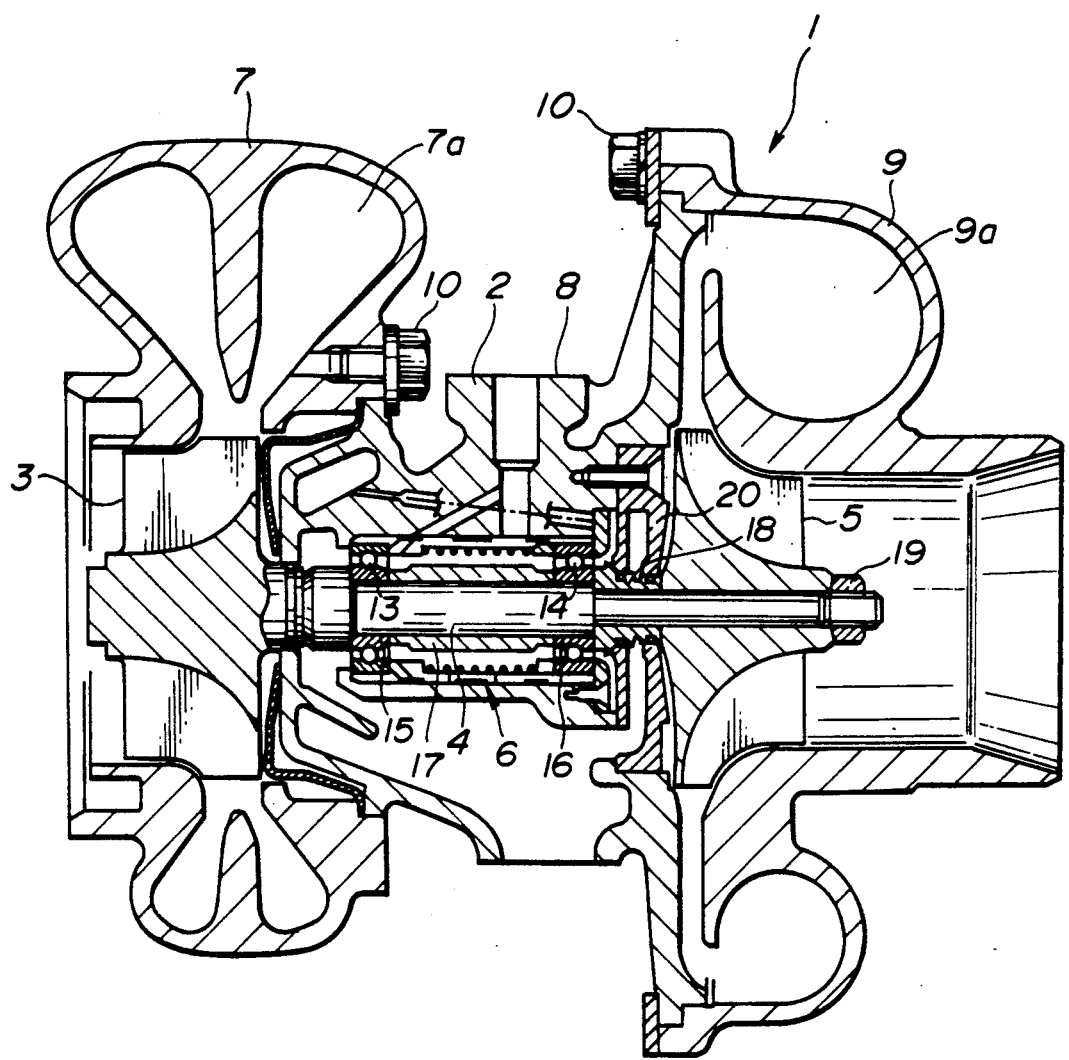
FIG. 1 is a vertical sectional view of a preferred embodiment of a supercharger (turbocharger) according to the present invention.
Figure 4:
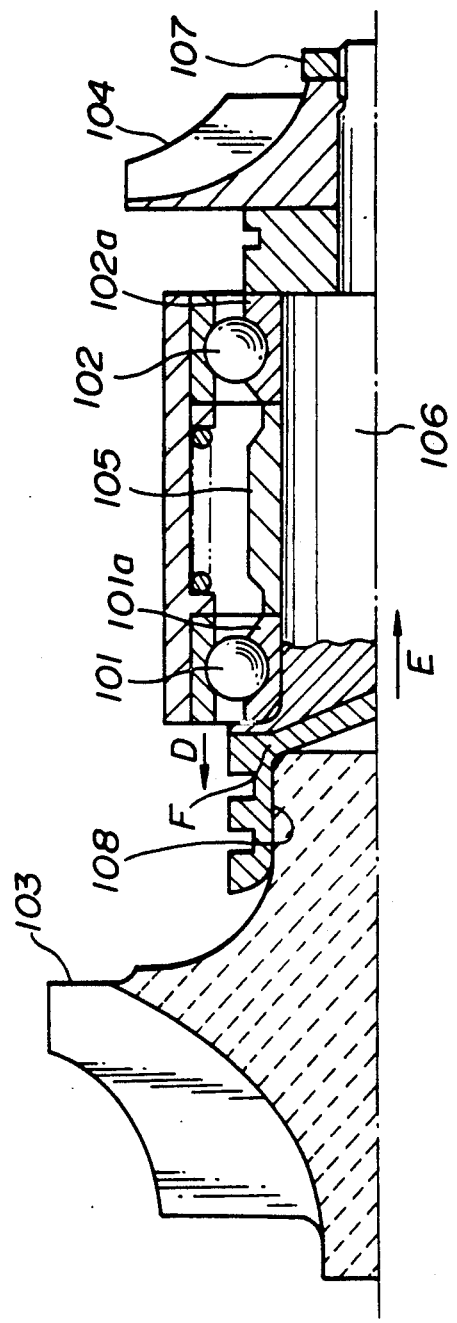
FIG. 4 is a fragmentary sectional view of an essential part of a conventional supercharger.

Referring now to FIGS. 1 and 2, a preferred embodiment of a supercharger (turbocharger) of the present invention is illustrated by the reference numeral 1. The turbocharger 1 of this embodiment is for an automotive vehicle (not shown) of a passenger car type. The turbocharger 1 comprises a rotatable shaft 4 to which a turbine wheel 3 is fixedly connected in a manner that their axes are aligned with each other. A compressor wheel 5 is fixedly mounted on the rotatable shaft 4. The rotatably shaft 4 is rotatably supported by a supporting structure 6 disposed in a middle casing 8 forming part of a turbocharger housing 2. The housing 2 includes a turbine casing 7 which covers the turbine wheel 3 and is formed with an exhaust scroll chamber 7a from which exhaust gas from an engine (not shown) is blown to the turbine wheel 3. The turbine casing 7 is independent from but fixedly connected with the middle casing 8 with bolts 10. The housing 2 further includes a compressor casing 9 which covers the compressor wheel 5 and is formed with an intake scroll chamber 9a through which compressed air is supplied to the engine. The compressor casing 9 is independent from but fixedly connected with the middle casing 8 by bolts 10.

The turbine wheel 3 is made of ceramic whose main component is, for example, silicon nitride. The turbine wheel 3 has an axial projection 11 which extends from one end (in the axial direction) of the turbine wheel 3 toward the rotatable shaft 4. The axial projection 11 is generally cylindrical and has an axis aligned with the turbine wheel 3. The rotatable shaft 4 is provided at its one end with a generally cup-shaped section 12 whose axis is aligned with the axis of the rotatable shaft 4 and the axis of the turbine wheel 3. The cup-shaped section 12 includes a generally cylindrical portion 12a whose one end is closed with a flat bottom portion 12b, forming an one-piece structure.

The projection 11 of the turbine wheel 3 is fixedly fitted in the cup-shaped section 12 of the rotatable shaft 4 in such a manner that the cylindrical peripheral surface of the projection 11 is in tight contact with the inner cylindrical surface of the cylindrical portion 12a of the cup-shaped section 12 and the flat surface 11a of the tip end of the projection 11 is in tight contact with the flat bottom inner surface 22 of the cup-shaped section bottom portion 12b. In this embodiment, the cup-shaped section 12 is made of Incoloy, whereas the rotatable shaft 4 is made of chromium-molybdenum steel. The cup-shaped section 12 is securely fixed to the rotatable shaft 4 by an electron-beam welding.

Fitting of the projection of the turbine wheel 3 is accomplished by a shrinkage fit which will be briefly discussed below. The inner diameter of the cylindrical portion 12a of the cup-shaped section 12 is smaller by about 50 $\mu$m than the diameter of the projection 11 of the turbine wheel 3 at ordinary temperature. The cup-shaped section 12 is heated to expand and then fitted on the projection 11. Upon lowering in temperature of the cup-shaped section 12, a rigid fitting is made between the cup-shaped section 12 and the projection 11 under a thermal shrinkage of the cup-shaped section.

The supporting structure 6 for the rotatable shaft 4 first and second ball bearings 13, 14 through which the rotatable shaft 4 is rotatably supported on the middle casing 8. The first and second ball bearings 13, 14 have respective inner races 15, 16. A cylindrical spacer 17 is securely disposed between the inner races 15, 16 thereby maintaining a predetermined distance between the inner races 15, 16.

The compressor wheel 5 is made of, for example, aluminum and mounted on the small-diameter section 4b of the rotatable shaft 4. The small-diameter section 4b is axially integral with the large-diameter section 4a and has a free end portion (no numeral) which is formed with an external thread (no numeral). A nut 19 is mounted on the free end portion of the rotatable shaft 4 to be engaged with the external thread. The ball bearings 13, 14 and the spacer 17 are mounted on the large-diameter section 4a which is formed at its left-side end portion (FIG. 2) with a radially outwardly extending flange-like portion 4c. The cup-shaped section 12 is fixedly secured to the end face of the left-side end portion of the large-diameter section 4a, so that the flange-like portion 4c is supported by the cup-shaped section 12. The flange-like portion 4c is formed with an abutting surface 21 to which the inner race 15 of the ball bearing 13 axially abuts. The major part of the abutting surface 21 is located radially inward of the outer peripheral surface of the cylindrical portion 12a of the cup-shaped section 12. The inner races 15, 16 of the ball bearings 13, 14 are also located radially inward of the outer peripheral surface of the cylindrical section 12a of the cup-shaped section 12. The inner race 15 of the ball bearing 13 is in tight contact with the flange-like portion 4c at the abutting surface 21, while the inner race 16 of the ball bearing 14 is generally flush with the end face of the right-side end portion (in FIG. 2) of the rotatable shaft large-diameter section 4a. An inner oil seal 18 is mounted on the small-diameter section 4b and located between the inner race 16 of the ball bearing 14 and the compressor wheel 5. Accordingly, by tightening or screwing up the nut 19, the two ball bearing inner races 15, 16, the spacer 17, the inner oil seal 18 and the compressor wheel 5 are tightly clamped between the nut 19 and the flange-like portion 4c supported by the cup-shaped section 12. Thus, the compressor wheel 5 is fixedly secured on the rotatable shaft 4 under the screw torque of the nut 19. The inner oil seal 18 cooperates with an outer oil seal 20 to prevent lubricating oil from flowing into the compressor casing 9.

The rotatable shaft 4 with the cup-shaped section 12 is dimensionally arranged as follows: The distance l (mm) between the flange-like portion abutting surface 21 and the cup-shaped section bottom inner surface 22 is determined relative to the screw torque P (kg). In this embodiment, the relationship between the distance l (mm) and the screw torque or axial tensile force P (kg) is expressed by the following formula:

$0.002 \leq l/P \leq 0.2$

The reasons why the formula $0.002 \leq l/P$ is established will be discussed with reference to FIG. 3. In the case of designing the turbine wheel 3 and the rotatable shaft 4 in the turbocharger to be used in a passenger car to prevent the outer diametrical dimension of the turbocharger 1 from changing, the relationship of $0.2 \leq l/P$ offers the following drawbacks:

a) Even if the distance l (mm) is larger than 0.2P, a fitting length α at which the projection 11 is covered with the cup-shaped section 12 is decreased thereby lowering a supporting force of the cup-shaped section 12 to the projection 11.

b) If the distance l (mm) is enlarged to be larger than 0.2P without decreasing the fitting length α, the position of the fitting structure of the cup-shaped section 12 and the projection 11 shifts to the turbine wheel side, so that the fitting structure is subjected to a high temperature due to exhaust gas. As a result, the fitting strength of the fitting structure is lowered so that the rotational balance of a rotating structure including the turbine wheel 3 and the rotatable shaft 4 tends to easily change.

c) If the distance l (mm) is larger than 0.2P while the location corresponding to the distance l (mm) is shifted to the compressor wheel side, the length of the rotatable shaft 4 supported by the bearings 13, 14 is reduced so as to make it difficult to stably support the rotatable shaft 4 which usually rotates at a high rotational speed such as 100,000 rpm.

Next, the reason why the formula $0.002 \leq l/P$ is established will be discussed with reference to FIG. 3 and the results of experiments in Table 1. The experiments were conducted as follows: A turbocharger used in the experiments was arranged the same as that shown in FIGS. 1 and 2, in which the outer diameter of the turbine wheel 3 was 60 mm; the diameter of the projection 11 was 12 mm; the outer diameter of the cup-shaped section 12 was 17 mm; and the diameter of the large-diameter section 4a (on which the bearing inner races 15, 16 are mounted), except for the flange-like portion 4c was 7.5 mm. The experiments included durability tests conducted while changing the distance l (mm) and the screw torque P (kg).

Such a turbocharger was tested by changing the distance l (mm) and the screw torque P (kg) to measure an unbalance amount (mg.mm) of a front-side portion A (indicated in FIG. 3) and a back-side portion B (indicated in FIG. 3) of the turbine wheel 3 and the run-out amount (μm) of a back-side portion C (indicated in FIG. 3). The results of the experiments are shown in Table 1.

The experiments included durability tests, and changing the distance l (mm) and the screw torque P. In each durability test, the turbocharger was suitably incorporated in an automotive internal combustion engine and subjected to a continuous operation cycle test for 5 hours. In the operation cycle test, and operation cycle was repeatedly carried out, in which each operation cycle consisted of an idling operation for 5 minutes, an engine operation at 50% load and at an engine speed of 2500 rpm for 5 minutes, and an engine operation at 100% load and at an engine speed of 6000 rpm for 5 minutes.

TABLE 1

| Distance l mm | Tensile force P kg | Unbalance amount (mg.mm) Portion A/Portion B | Run-out amount (μm) |
|---|---|---|---|
| 1.0 | 600 | 160/375 | 15 |
| 1.0 | 800 | 184/420 | 17 |
| 1.5 | 900 | 120/315 | 10 |
| 1.5 | 1200 | 184/450 | 20 |
| 2.0 | 900 | 48/75 | 4 |
| 4.0 | 1300 | 32/60 | 4 |
| 4.5 | 1300 | 24/30 | 2 |

The unbalance amounts shown in Table 1 were measured as follows: The joined rotating structure including the turbine wheel 3 and the rotatable shaft 4 with the cup-shaped section 12 was rotated before the durability test to obtain a rotational balance was obtained by shaving the front-side portion A and the back-side portion B of the turbine wheel 3 shown in FIG. 3. The thus balanced joined rotating structure was assembled in the turbocharger 1 and subjected to the durability test. After the durability test, the joined rotating structure was taken out of the turbocharger 1 and again rotated to obtain a rotational balance by using a balance weight which was shown as the unbalance amount (disorder in balance) in Table 1. Additionally, the joined rotating structure after the durability test was rotated to measure the run-out amount (shown in Table 1) at the back-side portion C (indicated in FIG. 3) in the axial direction of the turbine wheel 3, relative to the axial direction of the joined rotating structure.

As appreciated from FIG. 2, by setting the distance l (mm) at a value in accordance with the tensile force P (kg) in the axial direction so as to satisfy the relationship $l/P \geq 0.002$, the cup-shaped section 12 is prevented from deformation due to the tensile force P in the axial direction. As a result, the two bearing inner races 15, 16, the spacer 17, the inner oil seal 18 and the compressor wheel 5 placed between the cup-shaped section 12 and the nut 19 are rigidly fastened in position by tightening the nut 19, so that they are rigidly fixed to the rotatable shaft 4 like a single member. Additionally, as seen from Table 1, setting the distance l (mm) as discussed above effectively suppresses a change in the rotational balance of the turbine wheel 3 even upon use for a long period of time.

While only the shrinkage fit has been described as a method for joining the turbine wheel projection 11 and the cup-shaped section 12, it will be understood that the joining of them may be accomplished by other methods such as a cold fit, a press-fit, and one in which a brazing filler metal is filled in between the projection 11 and the cup-shaped section 12 while the projection 11 and the cup-shaped sections 12 are heated, the cup-shaped section 12 pressing down the projection 11 through the metal filler upon being cooled.

Although the principle of the present invention has been shown and described as being applied to the turbocharger, it will be understood that it may be applied to a gas turbine which has a structure as a supercharger in which intake air is compressed under the effect of energy obtained by combustion and supplied to a combustion chamber.

While the spacer 17 has been shown and described as being used between the opposite bearing inner races 15, 16, it will be appreciated that the spacer 17 may be omitted by increasing the width of the inner races.

As many apparently widely different embodiments of this invention may be made without departing from the spirit and scope thereof, it is to be understood that the invention is not limited to the specific embodiments disclosed herein, for example, the specific materials and numerical values, except as defined in the appended claims.

What is claimed is:

1. A supercharger comprising:
   a turbine wheel made of a ceramic and having an axially extending projection;
   a rotatable shaft made of metal having a generally cup-shaped section at its first end portion, said turbine wheel projection being fitted in said cup-shaped section;
   a rolling bearing for rotatably supporting said rotatable shaft and having an inner race;
   a compressor wheel fixedly mounted on said rotatable shaft at a second end portion which is opposite to said first end portion;
   a nut mounted on said rotatable shaft second end portion and engaged with an external thread formed on said shaft second end portion, said nut being lcoated axially outside of said compressor wheel;
   means by which said rolling bearing inner race and said compressor wheel are tightly clamped between said rotatable shaft cup-shaped section and said nut; and
   means for making a setting to satisfy a relationship expressed by the following formula:

$$l/P \geq 0.002$$

where l is a distance (mm) in the rotatable shaft, between a bottom inner surface of said cup-shaped section and an abutting surface against which said rolling bearing inner race axially abuts; and P is an axial tensile force (kg) developed by screwing up said nut in a direction of said cup-shaped section.

2. A supercharger as claimed in claim 1, wherein said means for making a setting to satisfies a relationship expressed by the following formula:

$$l/P \leq 0.2.$$

3. A supercharger as claimed in claim 1, wherein said turbine wheel projection is generally cylindrical and has an axis aligned with said rotatable shaft, and wherein said cup-shaped section includes a cylindrical portion which fittingly contacts with a cylindrical surface of said projection, and a bottom portion integrally closing an end of said cylindrical portion.

4. A supercharger as claimed in claim 3, wherein said turbine wheel projection has a tip end which contacts with said bottom inner surface of said cup-shaped section bottom portion.

5. A supercharger as claimed in claim 1, wherein said shaft has a generally radially outwardly extending annular surface located near said cup-shaped section, said annular surface corresponding to said abutting surface and being perpendicular to the axis of said rotatable shaft, the inner race of said rolling bearing axially contacting with said annular surface.

6. A supercharger as claimed in claim 5, wherein a major part of said annular surface is located radially inward of an outer peripheral surface of said cup-shaped section.

7. A supercharger as claimed in claim 1, wherein said rotatable shaft includes a shaft section which is fixedly connected with said cup-shaped section in an integral manner and in axial alignment, said rolling bearing, said compressor wheel and said nut being mounted on said shaft section.

8. A supercharger as claimed in claim 7, wherein said shaft section includes a radially outwardly extending flange-like portion fixedly secured to said cup-shaped section, said flange-like portion having a generally annular surface to which said bearing inner race axially contacts, said generally annular surface corresponding to said abutting surface and being generally perpendicular to the axis of said rotatable shaft.

9. A supercharger as claimed in claim 7, wherein said rolling bearing includes first and second rolling bearings which are located separate from each other and mounted on said shaft section, the inner race of said first rolling bearing axially abutting against said abutting surface, said second rolling bearing being located between said first rolling bearing and said compressor wheel.

10. A supercharger as claimed in claim 9, further comprising a cylindrical spacer disposed between the inner races of said first and second rolling bearings.

11. A supercharger as claimed in claim 2, wherein said projection tip end has a flat surface generally perpendicular to an axis of said turbine wheel, wherein said bottom inner surface of said cup-shaped section is perpendicular to an axis of said rotatable shaft.

12. A supercharger comprising:
    a turbine wheel made of a ceramic and having an axially extending projection;
    a rotatable shaft made of metal having means defining a concavity located at its first end portion, said turbine wheel projection being fitted in said concavity;
    a rolling bearing for rotatably supporting said rotatable shaft and having an inner race;
    a compressor wheel fixedly mounted on said rotatable shaft at a second end portion which is opposite to said first end portion;
    a nut mounted on said rotatable shaft second end portion and engaged with an external thread formed on said shaft second end portion, said nut being lcoated axially outside of said compressor wheel;
    means by which said rolling bearing inner race and said compressor wheel are tightly clamped between said rotatable shaft cup-shaped section and said nut; and
    means for making a setting to satisfy a relationship expressed by the following formula:

$$l/P \geq 0.002$$

where l is a distance (mm) in the rotatable shaft, between a bottom inner surface of said concavity and an abutting surface against which said rolling bearing inner race axially abuts; and P is an axial tensile force (kg) developed by screwing up said nut in a direction of said concavity.

* * * * *